United States Patent
LeMieux (10) Patent No.: US 7,822,560 B2
(45) Date of Patent: Oct. 26, 2010

(54) METHODS AND APPARATUSES FOR WIND TURBINE FATIGUE LOAD MEASUREMENT AND ASSESSMENT

(75) Inventor: David Lawrence LeMieux, Boulder, MT (US)

(73) Assignee: General Electric Company, Schenectady, NY (US)

( * ) Notice: Subject to any disclaimer, the term of this patent is extended or adjusted under 35 U.S.C. 154(b) by 921 days.

(21) Appl. No.: 11/020,470

(22) Filed: Dec. 23, 2004

(65) Prior Publication Data

US 2006/0140761 A1   Jun. 29, 2006

(51) Int. Cl.
G01B 3/44 (2006.01)
(52) U.S. Cl. .............................. 702/34; 73/577; 290/44; 324/76.13; 324/207.16; 416/61
(58) Field of Classification Search ................. 702/34, 702/41, 94, 141, 145; 73/168, 455, 856, 73/577; 290/44; 416/31, 61; 324/76.13, 324/207.16
See application file for complete search history.

(56) References Cited

U.S. PATENT DOCUMENTS

| 4,420,692 | A | * | 12/1983 | Kos et al. ........................ 290/44 |
| 4,955,269 | A | * | 9/1990 | Kendig et al. .................. 73/577 |
| 6,525,518 | B1 | * | 2/2003 | Garnaes .................... 324/76.13 |
| 6,949,922 | B2 | * | 9/2005 | Twerdochlib et al. .. 324/207.16 |
| 7,160,083 | B2 | * | 1/2007 | Pierce et al. ................... 416/61 |

OTHER PUBLICATIONS

The Long-Term Inflow and Structural Test Program, Sutherland, Jones & Neal, Wind Energy 2001, ASME/AIAA AIAA-2001-0039.*

* cited by examiner

Primary Examiner—John H Le
(74) Attorney, Agent, or Firm—Blakely, Sokoloff, Taylor & Zafman LLP (57) ABSTRACT

Techniques and apparatuses for wind turbine component fatigue load measurement and assessment are disclosed. In one embodiment the component is a tower, fore-aft and side-to-side signals from a two-axis accelerometer attached to a bedplate of a wind turbine are used to measure tower fatigue loads. A yaw axis azimuth position signal can also be used for tower fatigue load measurement and assessment.

23 Claims, 5 Drawing Sheets

METHODS AND APPARATUSES FOR WIND TURBINE FATIGUE LOAD MEASUREMENT AND ASSESSMENT

TECHNICAL FIELD

The invention relates to wind turbine generators. More particularly, the invention relates to measurement of wind turbine fatigue loading of tower, main shaft, and/or rotor blades components.

BACKGROUND

Wind power is generally considered the fastest growing energy source worldwide. The long-term economic competitiveness of wind power as compared to other energy production technologies has challenged members of the wind power industry to reduce wind power energy costs. One issue for concern for wind turbine operators is damage due to fatigue loads caused by fluctuating wind conditions. Assessing fatigue loads is important in the wind energy generation industry because fatigue load data can be used to verify designs are not over-engineered.

Fatigue loads can also be monitored to determine performance in various environments and in various conditions. Knowledge of fatigue loads can also be beneficial to the operator because the operating conditions and service life of a wind turbine may be adjusted by the operator to improve profit margins.

For example, by knowing the cumulative equivalent fatigue damage level of the turbine components, the operator may safely run the turbine beyond the design life and thus extend the service life because the service life becomes based on the measured cumulative equivalent fatigue damage levels instead of a theoretically derived cumulative equivalent fatigue damage used to predict a chronological design life based on wind data. For another example, in low wind seasons or low wind years where reduced fatigue damage occurs, the operator may increase the aggressiveness of turbine operation to work harder and accumulate more fatigue cycles while capturing more energy during the wind events. In this example, controlling the turbine operating aggressiveness level based on cumulative equivalent fatigue damage levels allows the operator to capture more energy and more profit on newly installed turbines. Thus the operator may benefit by matching turbine performance to achieve economic models based on cumulative equivalent fatigue damage levels. (e.g. Increased revenues can be generated while the turbine is new to benefit time-value-of-money models).

Currently, fatigue loads are generally measured using sensors such as bonded or welded strain gauges that require expertise to install and maintain and have only a limited life cycle of 6 to 24 months. Thus, current fatigue monitoring techniques are complex, costly and unreliable for long life applications.

SUMMARY

The position displacement, strain or otherwise load on a wind turbine component is determined using sensor typically attached to the component. Key wind turbine components that typically require measurement to determine equivalent fatigue damage levels include the tower, the main shaft and one or more rotor blades. Data from measured displacement or strain levels obtained from sensors is used in techniques known in the art that are used to assess and determine fatigue damage.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques and apparatuses for wind turbine tower, main shaft, and rotor blade(s) fatigue load measurement and assessment are disclosed. In one embodiment, and referencing the tower, fore-aft and side-to-side signals from a two-axis accelerometer attached to a bedplate of a wind turbine and yaw axis signals or yaw azimuth position signals are used to measure tower fatigue loads. Use of solid state components (e.g., an accelerometer, a gyroscope) with a relatively long service life can provide fatigue load measurement with relatively low maintenance requirements. Another benefit is that these sensors are already commonly used on existing current wind turbines and therefore, these sensors can also be used for fatigue load measurement and assessment purposes, which allows fatigue load measurement and assessment to be provided at a relatively low cost.

In another embodiment, and referencing the main shaft, proximity probes can be used to measure the shaft deflection. In yet another embodiment, and referencing the rotor blade(s), proximity probes can be used to measure shaft deflection and by also measuring rotor speed and blade azimuth position, the blade root bending moments can be determined. These embodiments provide a mechanism to measure position displacement, strain or otherwise load on wind turbine components. Using this information and applying routines commonly known in the art, equivalent loads can be determined.

Figure 1:
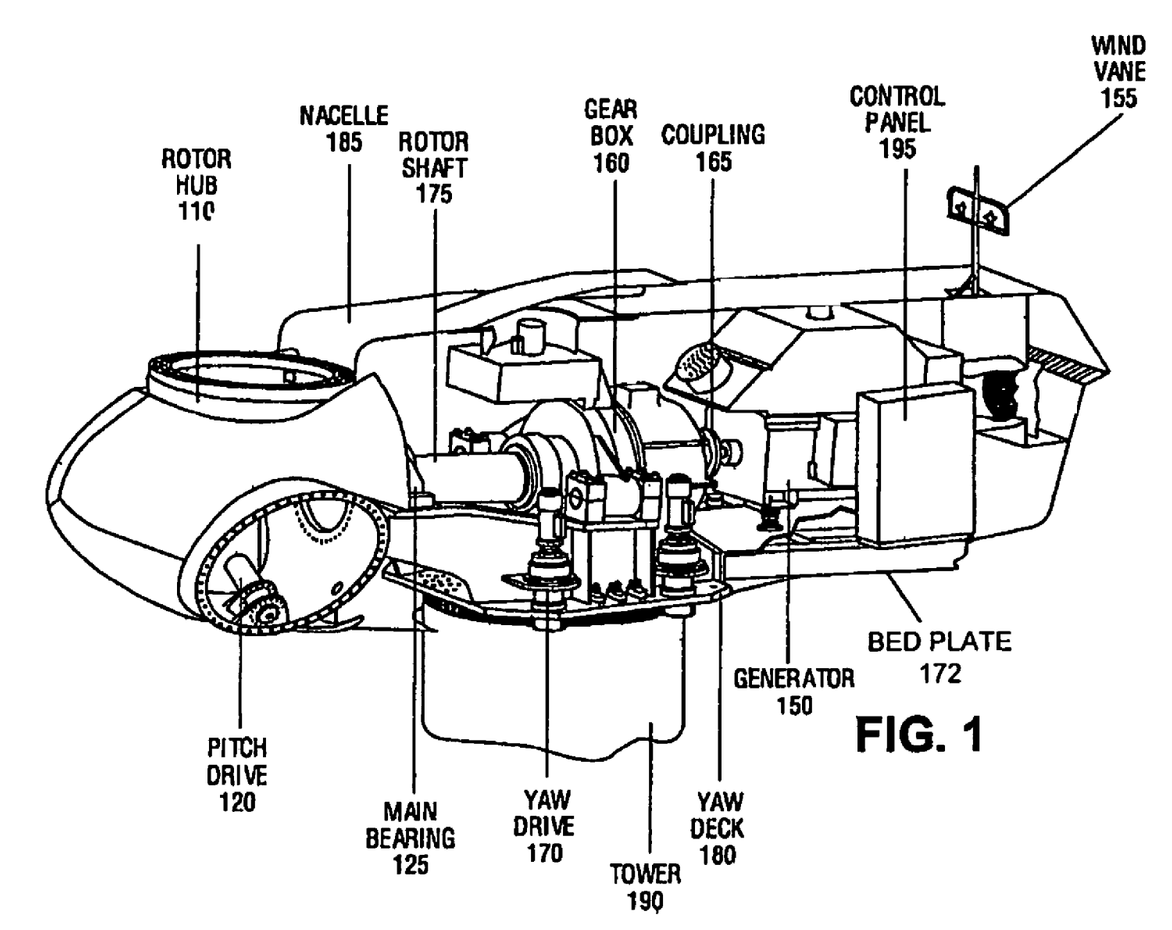
FIG. 1 is one embodiment of wind turbine components.

FIG. 1 is one embodiment of wind turbine components. The components of FIG. 1, except for hub 110, are housed in nacelle 185 atop tower 190. The height of tower 190 can be selected based on factors and conditions known in the art. In one embodiment, multiple microcontrollers (e.g., within control panel 195) are used for overall system monitoring and control including, for example, pitch and speed regulation, high-speed shaft and yaw brake application, yaw and pump motor application and fault monitoring. Alternative distributed or centralized control architectures can also be used.

In operation, the control system provides control signals to variable blade pitch controller 120 to control the pitch of blades (not shown in FIG. 1) that drive hub 110 as a result of wind. In operation, hub 110 receives three blades; however, any number of blades can be used. Hub 110 and the turbine blades combine to form a wind turbine rotor.

The drive train of the wind turbine includes rotor shaft 175 connected to hub 110 and gear box 160 that is used to drive generator 150. In one embodiment, rotor torque is transmitted through coupling 165. Any type of generator, for example, a wound rotor induction generator can be used in the wind turbine of FIG. 1. Yaw drive 170 and yaw deck 180 provide a yaw orientation system for the wind turbine. In one embodiment, the yaw system is electrically monitored and controlled by the control system based on information received from wind vane 155 mounted on nacelle 185.

Typically, implementation of long-lived, reliable sensors in a wind turbine is difficult. For example, climatic exposure, vibration caused by dynamic loading, rotating forces, and the need for a rotating interface or telemetry for transmitting loads data to the turbine's control system present difficult challenges. To reduce the complexity, cost and reliability problems associated with conventional sensor types currently used on key components such as, for example, the blades, hub, main shaft, main frame, yaw deck and tower, described herein is the use of a accelerometers, gyroscopes and/or inclinometers that can be attached to the main frame, or other turbine structure. Described below is an embodiment using accelerometers to determine bed plate position; however, in other embodiments, gyroscopes can also be used for fatigue load measurement and assessment with appropriate modifications to the mathematical operations performed on accelerometer output signals.

The accelerometer platform contains one or more accelerometers used to sense acceleration caused by movement of the wind turbine component being monitored, in this case the bed plate 172 or any fixed frame near the tower top. As the bed plate reacts to loads and moments caused by forcing functions from the rotor and system dynamics, the bed plate undergoes movement. An accelerometer or a gyroscope (e.g., an electromechanical gyroscope, a piezo-electric gyroscope, inertial measurement unit such as a laser-based device capable of sensing linear or angular displacement) can be used to determine the displacement of the main frame relative to the ground surface (not shown). The displacement data can then be used for fatigue analysis.

Figure 2:
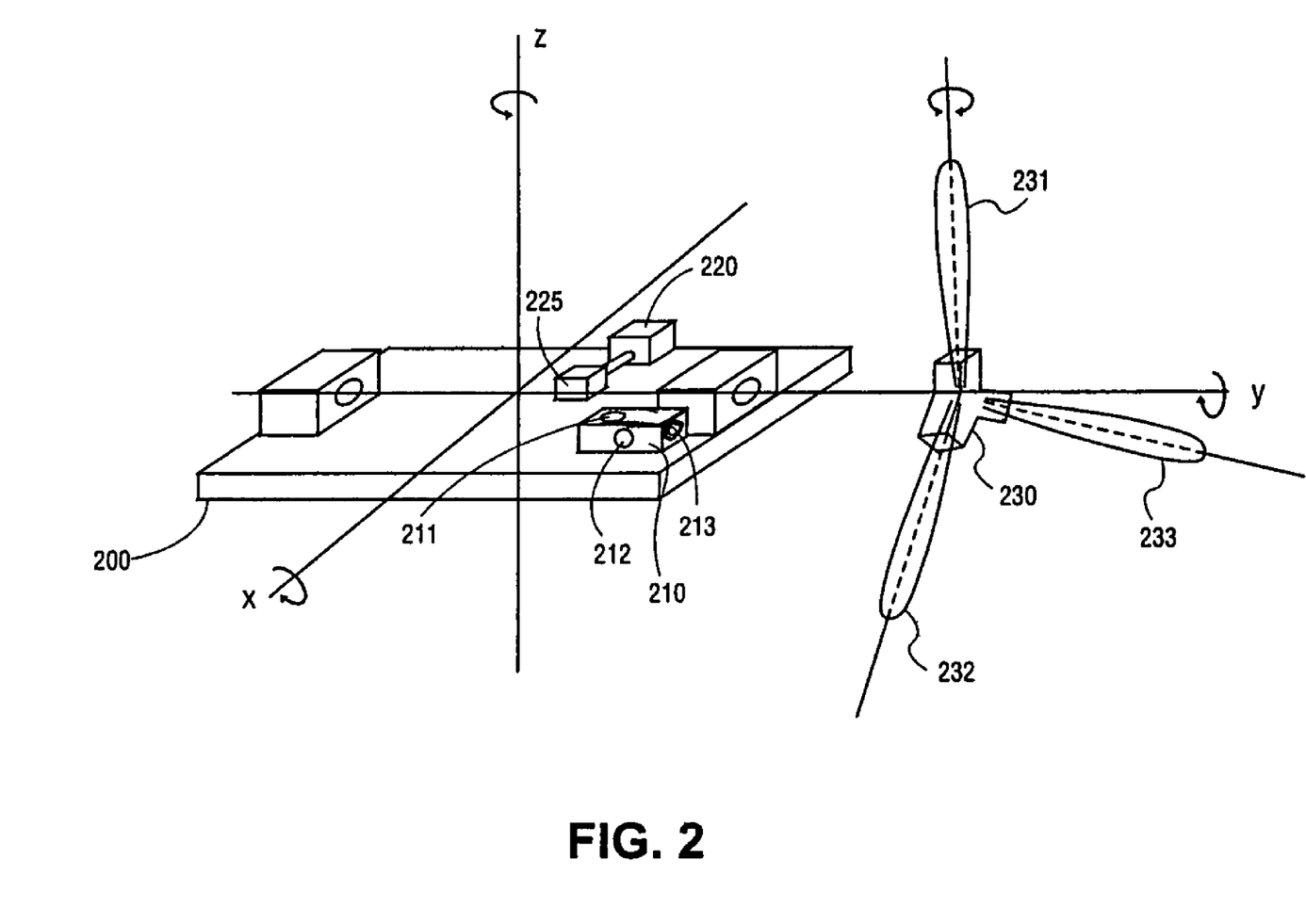
FIG. 2 is a block diagram of a wind turbine rotor and main frame with an accelerometer platform and a turbine controller.

FIG. 2 is a block diagram of a wind turbine rotor and main frame with an accelerometer platform and a turbine controller. In one embodiment, bed plate 200 supports various wind turbine components including turbine controller 220 and platform 210. In one embodiment, platform 210 includes one or more accelerometers (e.g., orthogonally positioned accelerometers 211, 212, 213) that react to accelerations caused by movement of bed plate 200. In an alternate embodiment, platform 210 includes three rate-type gyroscopes. Alternatively, heading-type gyroscopes can be used to measure turn angle rather than turn rate. A different number of gyroscopes and/or accelerometers can also be used.

In one embodiment, for either type of gyroscope, a piezo crystal located within the gyroscope assembly bends due to inertial forces when the gyroscope assembly is moved. The stress and strain produced by the bending of the crystal generates a voltage. This voltage output can be used to determine the rate of displacement of the main frame structure. This information along with the elapsed or incremental time of the event can be used to determine the magnitude, duration, and orientation of the resultant load acting on the wind turbine tower, which can be used for fatigue analysis.

In one embodiment, turbine controller 220 is coupled with the accelerometers of platform 210 to determine the position of bedplate 200 by measuring accelerations caused by loads placed on the turbine components. By determining the 2-axis position of bedplate 200 corresponding to, for example, fore/aft and side-to-side motion, turbine controller 220 can determine the loads that are placed on components of the turbine including the wind turbine tower. In an alternate embodiment, turbine controller 220 can determine the loads that are placed on components of the turbine including the wind turbine tower and correlate such load to a specific fixed frame tower bending reference direction or directions (for example a North-South direction and an East-West direction). Turbine controller 220 (or other computational component) can then perform fatigue load measurement and assessment operations on the signals received from the accelerometers and the bedplate 200 yaw azimuth position angle 240 to determine current, cumulative and historical fatigue loads on the wind turbine tower.

In one embodiment, turbine controller 220 (or other computational component) can process the signals received from the accelerometers to correct for yaw position, which allows outputs from a two-axis accelerometer to be "aligned" with a strain gauge axis at the base of the tower. That is, the accelerometer output signals are transformed from a main frame with variable yaw reference frame to a tower base reference frame. In one embodiment, a low pass filter is applied to the accelerometer output signals and the filtered signals are integrated twice to generate position data. This processing provides a first stage of correlation with a corresponding tower strain gauge. Next, a transformation is applied to tower top displacement sensor data to correct for yaw position and achieve reference to corresponding 2-axis fixed form tower bending moments such as the North-South and East-West directions. Strain gauges located at the base of the tower measure 2-axis bending moments that may correspond to the reference North-South and East-West fixed frame directions. Tower base strain gauge signals may be used to verify that signals obtained from the above embodiments are accurate within an acceptable range; however strain gauges for measuring tower bending moments are not required.

In one embodiment, improved correlation can be achieved by applying a 3P notch filter to the twice-integrated accelerometer signals (i.e., the position data) to compensate for tower dam effects for a wind turbine with three blades. Other types of filters can be applied for wind turbines having different configurations. Other computational techniques can also be used.

Figure 3:
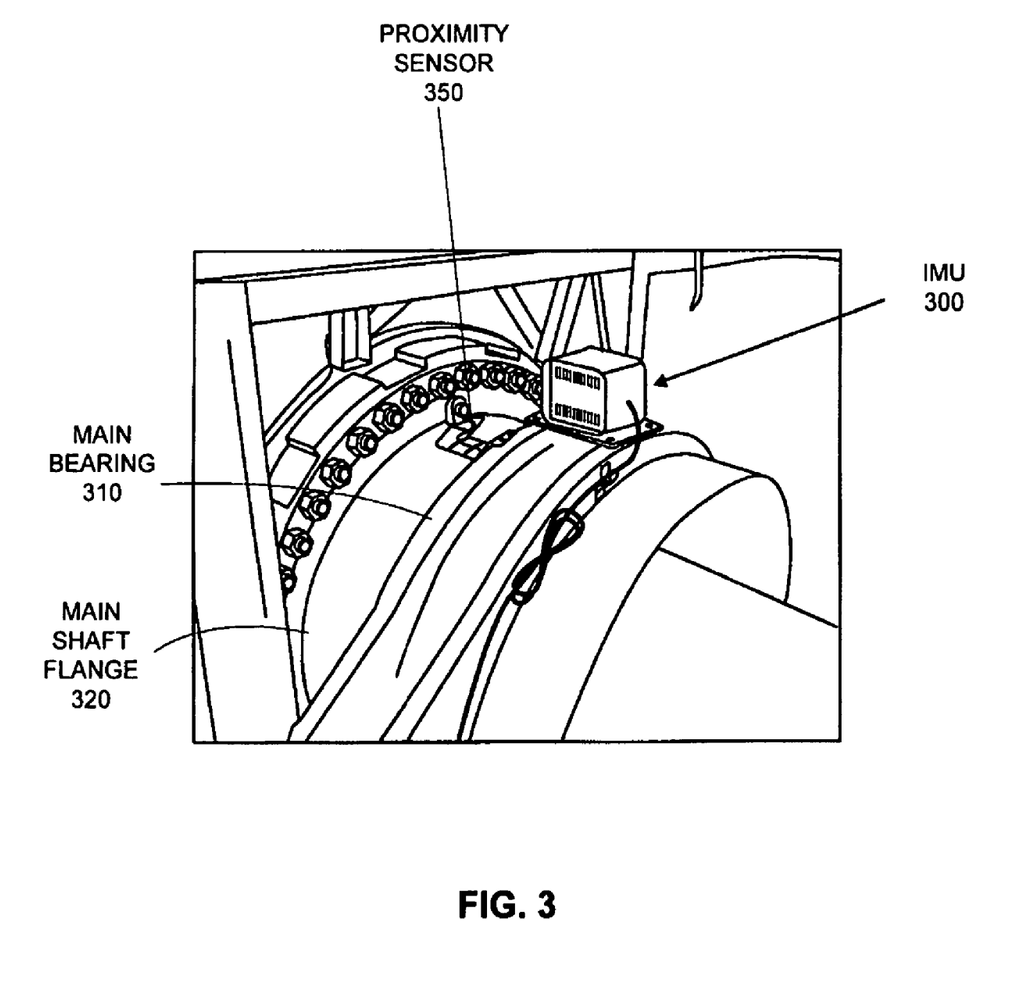
FIG. 3 illustrates one embodiment of a wind turbine having an inertial measurement unit (IMU) and main shaft deflection measuring proximity sensors.

FIG. 3 illustrates one embodiment of a wind turbine having an inertial measurement unit (IMU). In one embodiment, IMU 300 is connected to main bearing casing 310. IMU 300 is a gyroscope and accelerometer-based device that provides measurement of roll, pitch and yaw angles, and three axis accelerations. IMU 300 is coupled to a turbine controller that determines loads based on IMU measurements. Output signals from IMU 300 can be used as described above to perform fatigue measurement and assessment functions.

FIG. 3 also illustrates one embodiment of proximity sensors attached to the main bearing casing 310 and positioned to measure main shaft flange 320 displacements caused by rotor motion. In one embodiment, a minimum of three proximity sensors (e.g., 350) are used to determine the plane surface position of the main shaft flange 320. Next, referring to FIG. 4, in one embodiment, main shaft proximity sensors (e.g., 410, 420, 430) are located adjacent to the gearbox. Sensors 410 and 420 detect rotational rate of the main shaft 400 and sensor 430 detects blade azimuth position by triggering a pulse signal corresponding to a reset tab (not shown) that is positioned to rotate along the same azimuth position as one rotor blade.

Figure 4:
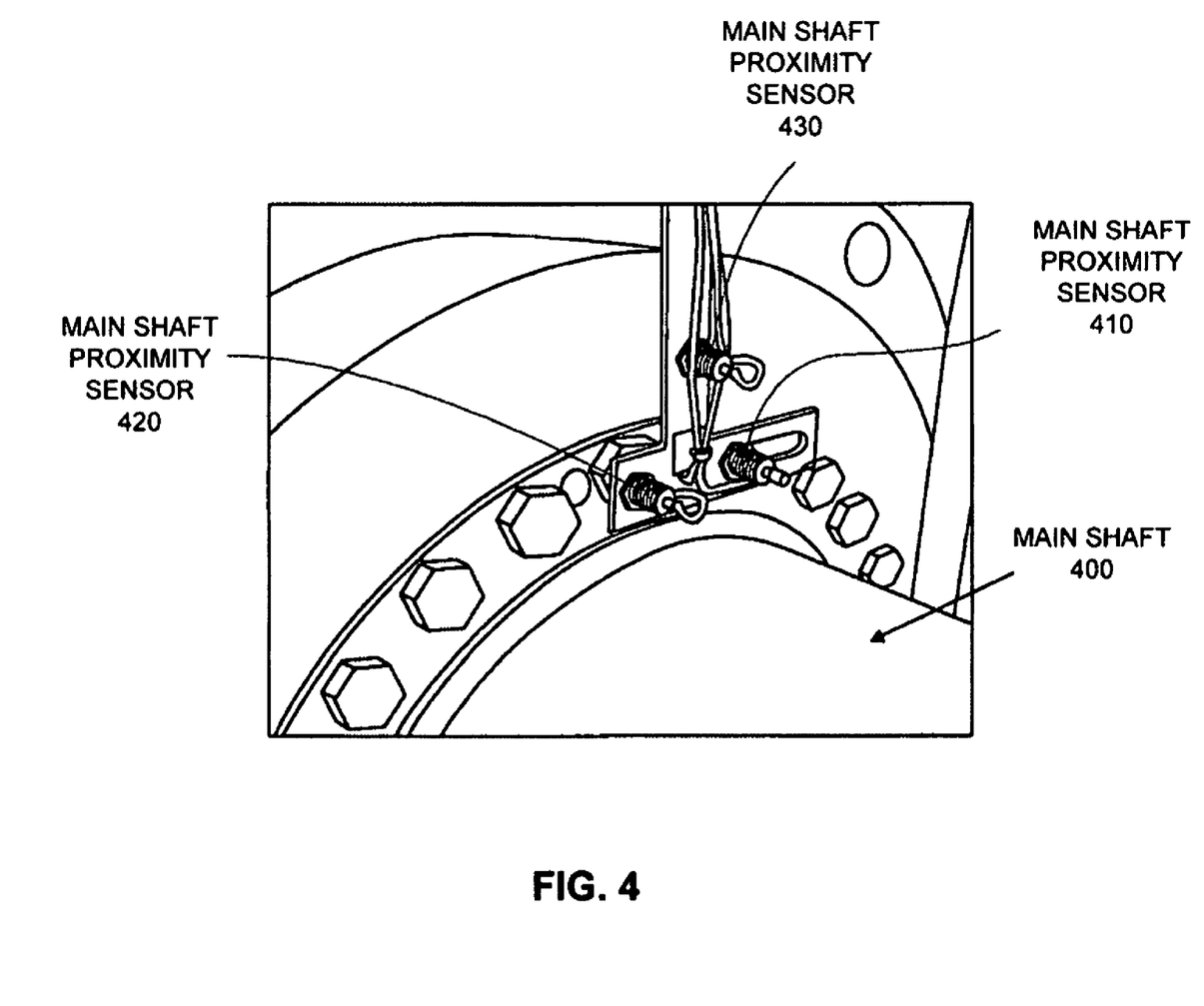
FIG. 4 illustrates one embodiment of proximity sensors that measure main shaft speed and blade azimuth position.

Alternate sensor positions can also be used. For example, proximity sensors can be attached to the blades. Also, alternate sensors such as a main shaft 400 encoder can be used. In one embodiment, the main shaft flange 320 plane position combined with main shaft 400 speed and rotor azimuth position can be used by the turbine controller 220 to compute fatigue of one or more rotor blades in the flapwise axis.

In an alternate embodiment, rotor blade fatigue may also be determined by measuring wind turbine rotor blade movement relative to and rotor hub frame. Rotor blade bending movement may be detected with, for example, an Aeropac proximity sensor platform. Output signals from the Aeropac sensor platform may be analyzed by the turbine controller 220 to determine rotor blade fatigue.

Figure 5:
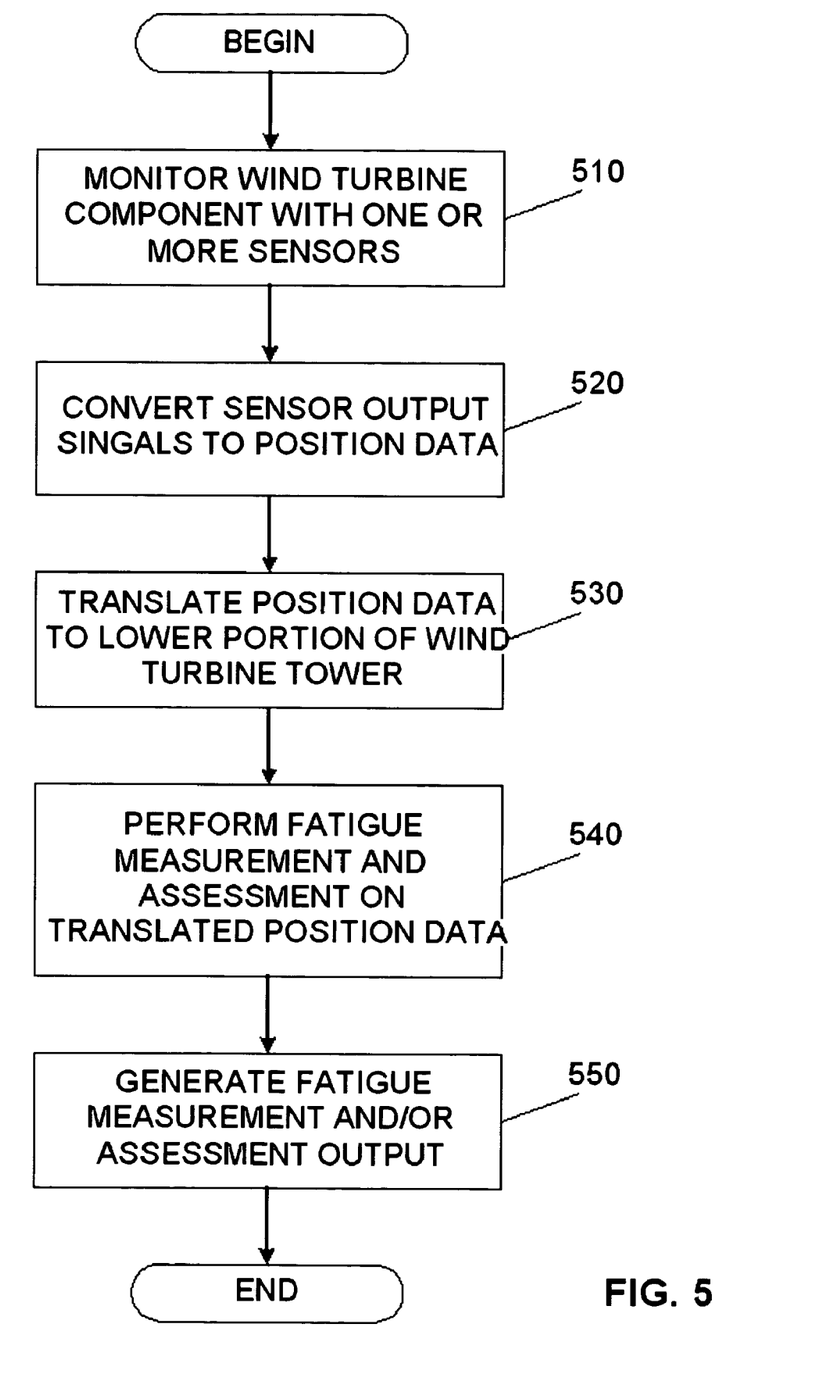
FIG. 5 is a flow diagram of one embodiment of a technique for measuring and assessing wind turbine tower fatigue loads using accelerometers attached to a component atop a tower.

FIG. 5 is a flow diagram of one embodiment of a technique for measuring and assessing wind turbine tower fatigue loads using accelerometers attached to a component atop a tower. The operations of FIG. 5 are set forth with a specific order; however, a different ordering of operations can also be performed.

Wind turbine components are monitored with one or more sensors, 510. In one embodiment, one or more accelerometers are used to monitor acceleration of a bedplate of the wind turbine caused by bending movements of the tower. Other wind turbine components, for example, a gear box of the wind turbine, a main shaft of the wind turbine, or a generator of the wind turbine can also be monitored. In alternate embodiments, gyroscopes and/or other sensors can also be used.

In one embodiment, the output signals from the one or more sensors are converted to position data, 520. This can be accomplished, for example, by twice integrating acceleration signals from the accelerometers. If the sensor data does not provide acceleration, for example, if the sensors are gyroscopes, which provide rotation data, different mathematical operations are used to generate position or movement data. A measured yaw position data may also be used to transform sensor data to a 2-axis orthogonal tower base bending reference positions, such as North-South and East-West. In one embodiment, both accelerometers and gyroscopes can be used.

The position data is translated from the frame of reference of the sensors to a frame of reference corresponding to a lower portion of the wind turbine tower, 530. Translation can be accomplished in any manner known in the art. Translation is used to verify that the sensors above are working correctly, strain gauges at the tower base are not required for all turbines and would only be installed for test and verification purposes.

In one embodiment, the frame of reference corresponding to the lower portion of the wind turbine tower is a location within the turbine tower that a strain gauge is traditionally positioned. Using this embodiment, traditional fatigue analysis can be performed using the translated position data. In alternate embodiments, other locations can also be used. By translating the movement data to the lower portion of the turbine tower, fatigue load measurement and assessment can be performed for the tower. Any technique for translating coordinate axes can be used.

As an alternative to filtering, a PID controller may process the tower top accelerations and yaw azimuth position. While there is likely to be a scaling difference between the tower top load method and the tower base load method, an appropriate scaling factor may be used to allow fatigue measurement and assessment to be accomplished. As described above (530) tower fatigue is determined mainly in the $1^{st}$ and $2^{nd}$ bending modes. Tower fatigue may be assessed and one or both of these modes or to other bending modes. Fatigue may also be assessed for other wind turbine components.

Fatigue load measurement and/or assessment is performed on the translated and adjusted position data, 540. An output corresponding to the fatigue load measurement and/or assessment is generated, 550. The output can be a graphical representation of current and/or historical fatigue load measurements. The output can also be data stored in a computer-readable medium that corresponds to fatigue load measurements. Other outputs can also be generated.

In an alternate embodiment, fatigue assessment may be performed without transformation to base of tower. This may be accomplished, for example, by matching signals above to the strain signal below. Thus, a 2-axis tower bending signal may be generated that should be equal to the set of signals from the tower top sensors with other verification signals from the tower base strain gauge sensors. Signals from the tower base strain gauge sensors may be used as a baseline because they can be shunt or tower-pull calibrated.

The fatigue assessment method illustrated in FIG. 5 is for fatigue assessment of the tower resulting from tower bending. However, it is appreciated by this illustration that sensor measurement signals described herein could be applied to similar techniques and/or mechanisms to determine fatigue assessment of the main shaft or rotor blade(s).

The sensor signals may also be used to determine other characteristics and/or conditions of a wind turbine system. For example, the spectral frequency of a wind turbine tower may be used to determine whether a foundation or a tower-bedplate connection may be failing. As another example, the spectral frequency of the main shaft may be used to determine a crack in the shaft, damage to the gearbox or drive train or damage to a rotor and/or cracks or damage to the turbine foundation. Further, the main shaft flange method of measurement may be used to determine a rotating vector depicting mean flapwise deflection of the rotor blades that may be used to determine a blade aerodynamic imbalance.

In one application example, equivalent tower fatigue damage information may be achieved using inputs from solid state tower-top motion sensors (such as multi-axis accelerometers, inclinometers, gyros or the like) coupled with a yaw position sensor and applying mathematical techniques such as double integration, filtering, transformation and signal scaling in such a way as to produce a reference orthogonal 2-axis tower base bending moments. Although orthogonal 2-axis tower bending moment signals can be obtained by using strain gauges, use of strain gauges would only be used to verify accuracy of the solid-state sensors located near the tower-top. The orthogonal 2-axis tower bending may be referenced to permanent positions such as North-South and East-West.

In another application example, equivalent main shaft and/or rotor blade fatigue damage may be achieved using inputs from solid state tower-top motion sensors (such as an IMU containing 3-axis accelerometers and 3-axis rate gyros or the like) coupled with main shaft speed and blade azimuth position sensors (such as digital proximity probes or an absolute encoder) and applying mathematical techniques such as double integration, filtering, transformation and signal scaling in such a way as to produce a reference orthogonal 2-axis main shaft or rotor blade bending moments.

In another application example, equivalent main shaft and/or rotor blade fatigue damage may be achieved using inputs from solid state tower-top motion sensors (such as at least three analog approximately orthogonally positioned proximity probes—for measuring main shaft flange deflections) coupled with main shaft speed and blade azimuth position sensors (such as digital proximity probes or an absolute encoder) and applying mathematical techniques such as double integration, filtering, transformation and signal scaling in such a way as to produce a reference orthogonal 2-axis main shaft or rotor blade bending moments.

In the application examples above, one objective is to produce equivalent fatigue data of key wind turbine components.

The methods mathematical methods described may produce strain or load signals that are equivalent to what would be produced if the components were instrumented with strain gauges; however, because the sensors are solid state, they have longer life, which may provide a more cost effective wind turbine design.

The results of fatigue analysis may also be used to determine the aggressiveness of turbine operation. For example, a turbine controller may selectively cause a wind turbine to operate above rated levels.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   determining position of a wind turbine generator component within a nacelle with respect to a reference location also within the nacelle with one or more sensors coupled with the wind turbine generator component;
   receiving output signals from the one or more sensors with a turbine controller communicatively coupled with the one or more sensors;
   performing tower fatigue analysis with the turbine controller based on the output signals from the one or more sensors wherein results from the tower fatigue analysis comprise a spectral frequency analysis and further wherein the spectral frequency analysis is used to predict fatigue of a lower portion of the tower; and
   generating, with the turbine controller, a graphical user-readable output based on the fatigue analysis indicating fatigue life information.

2. The method of claim 1 further comprising using results from the fatigue load analysis to control turbine performance.

3. The method of claim 1 further comprising estimating historical fatigue based, at least in part, on results from the fatigue load analysis.

4. The method of claim 1 wherein determining position of the wind turbine generator component comprises:
   receiving output signals from one or more accelerometers;
   correcting the received accelerometer signals for yaw position of the wind turbine generator component; and
   generating a position indication corresponding to the wind turbine generator component by twice integrating the acceleration signals received from the one or more accelerometers.

5. The method of claim 4 further comprising applying a notch filter to the movement data.

6. The method of claim 1 wherein determining movement of the wind turbine generator component atop the tower comprises:
   receiving output signals from one or more gyroscopes;
   correcting the received gyroscope signals for yaw position of the wind turbine generator component; and
   generating a position indication corresponding to the wind turbine generator component from the signals received from the one or more gyroscopes.

7. The method of claim 1 wherein the wind turbine generator component comprises one of: a tower corresponding to the wind turbine generator having the wind turbine generator component, a bedplate of the wind turbine generator having the wind turbine generator component, a gear box of the wind turbine generator having the wind turbine generator component, a main shaft of the wind turbine generator having the wind turbine generator component, and a generator of the wind turbine having the wind turbine generator component.

8. An article comprising computer-readable medium having stored thereon instructions that, when executed, cause one or more processors to:
   determine position of a wind turbine generator component within a nacelle with respect to a reference location also within the nacelle with one or more sensors coupled with the wind turbine generator component;
   perform tower fatigue analysis based on output signals from the one or more sensors wherein results from the tower fatigue analysis comprise a spectral frequency analysis and further wherein the spectral frequency analysis is used to predict fatigue of a lower portion of the tower; and
   generate a graphical user-readable output based on the fatigue analysis indicating fatigue life information.

9. The article of claim 8 further comprising instructions that, when executed, cause the one or more processors to use results from the fatigue load analysis to control turbine performance.

10. The article of claim 8 further comprising instructions that, when executed, cause the one or more processors to estimate turbine historical fatigue based, at least in part, on results from the fatigue load analysis.

11. The article of claim 8 wherein the instructions that cause the one or more processors to determine the movement of the wind turbine generator component comprise instructions that, when executed, cause the one or more processors to:
   receive output signals from one or more accelerometers;
   correct the received accelerometer signals for yaw position of the wind turbine generator component; and
   generate a position indication corresponding to the wind turbine generator component by twice integrating the acceleration signals received from the one or more accelerometers.

12. The article of claim 11 further comprising instructions that, when executed, cause application of a notch filter to the movement data.

13. The article of claim 8 wherein the instructions that cause the one or more processors to determine the movement of the wind turbine generator component comprise instructions that, when executed, cause the one or more processors to:
   receive output signals from one or more gyroscopes;
   correct the received gyroscope signals for yaw position of the wind turbine generator component; and
   generate a position indication corresponding to the wind turbine generator component from the signals received from the one or more gyroscopes.

14. The article of claim 8 wherein the wind turbine generator component comprises one of: a tower of the wind turbine, a main frame of the wind turbine, a gear box of the wind turbine, a main shaft of the wind turbine, and a generator of the wind turbine.

15. An apparatus comprising:
   one or more sensors to detect a condition caused by movement of a component of a wind turbine generator within a nacelle, the one or more sensors to generate condition signals indicating the condition of the component;

control circuitry coupled with the one or more sensors to receive the condition signals and to determine a position of a wind turbine generator component atop a tower based on the condition signals from the one or more sensors, to transform the determined position from a frame of reference corresponding to sensor locations to a frame of reference corresponding to a lower portion of the tower and to perform fatigue load analysis on the transformed position corresponding to the lower portion of the tower.

16. The apparatus of claim 15 wherein the wind turbine component comprises one of: a tower corresponding to the wind turbine generator having the wind turbine generator component, a main frame of the wind turbine generator having the wind turbine generator component, a gear box of the wind turbine generator having the wind turbine generator component, a main shaft of the wind turbine generator having the wind turbine generator component, and a generator of the wind turbine generator having the wind turbine generator component.

17. The apparatus of claim 15 wherein the condition comprises an acceleration.

18. The apparatus of claim 15 wherein the one or more sensors comprise one or more accelerometers and wherein the control circuitry receives the condition signals from the one or more accelerometers and corrects the received condition signals for yaw position of the wind turbine generator component to generate a position indication corresponding to the wind turbine component.

19. The apparatus of claim 18 wherein the control circuit performs an integration operation on the condition data to determine a movement of the wind turbine generator component.

20. The apparatus of claim 19 wherein the control circuit causes application of a notch filter to the movement data.

21. The apparatus of claim 15 wherein the condition comprises a rotation.

22. The apparatus of claim 15 wherein the condition comprises bending.

23. The apparatus of claim 15 wherein the one or more sensors comprise one or more gyroscopes and wherein the control circuitry receives the condition signals from the one or more gyroscopes and corrects the received condition signals for yaw position of the wind turbine generator component to generate a movement indication corresponding to the wind turbine generator component.

* * * * *